(No Model.) 2 Sheets—Sheet 1.

F. E. FISHER.
ELECTRIC MOTOR OR GENERATOR.

No. 350,728. Patented Oct. 12, 1886.

WITNESSES
Jno. E. Wiles
Th. B. O'Dogherty

INVENTOR
Frank E. Fisher
By Wells W. Leggett
Attorney

N. PETERS, Photo-Lithographer, Washington, D. C.

(No Model.) 2 Sheets—Sheet 2.
F. E. FISHER.
ELECTRIC MOTOR OR GENERATOR.
No. 350,728. Patented Oct. 12, 1886.
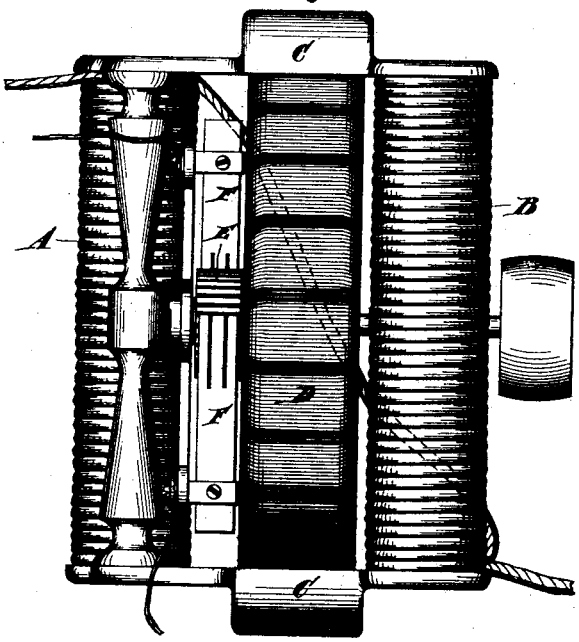
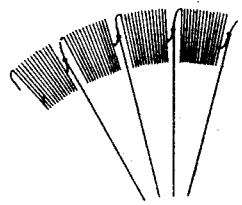
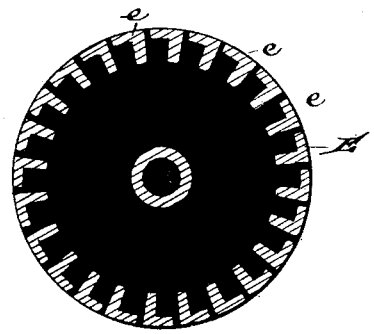
WITNESSES
Jno. E. Wiles
Th. B. O'Dogherty
INVENTOR
Frank E. Fisher
By Wells W. Leggett,
Attorney

UNITED STATES PATENT OFFICE.

FRANK E. FISHER, OF DETROIT, MICHIGAN.

ELECTRIC MOTOR OR GENERATOR.

SPECIFICATION forming part of Letters Patent No. 350,728, dated October 12, 1886.

Application filed April 30, 1886. Serial No. 200,665. (No model.)

*To all whom it may concern:*

Be it known that I, FRANK E. FISHER, of Detroit, county of Wayne, State of Michigan, have invented a new and useful Improvement in Electric Motors or Generators; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter specified, and more particularly pointed out in the claims.

Figure 1:
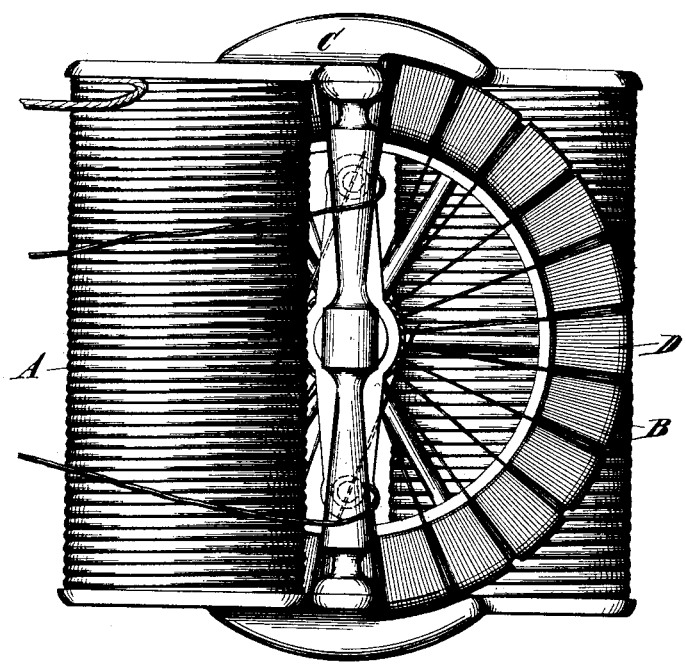
Figure 2:
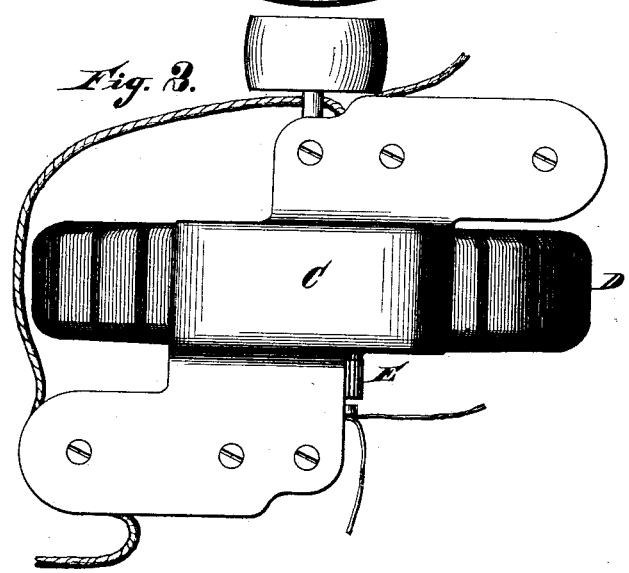

Figure 1 of the drawings is a side elevation of an electric motor embodying my invention. Fig. 2 is a plan view of the same. Fig. 3 is an end elevation of the same. Fig. 4 is a detail view of the commutator. Fig. 5 illustrates the winding of the armature-bobbins and the method of connecting them with the commutator-segments.

It is the purpose of my invention to produce a motor which shall be of simple construction, and which shall be capable of delivering a larger percentage of the power required to run it, and this I purpose to accomplish by so constructing the motor that the plane of revolution of its armature shall be in the same plane with the two poles of the field-magnets and in a plane parallel with and between two other planes containing, respectively, the two field-magnets.

Heretofore in the construction of electric generators or motors it has been customary, as a usual thing, to so adjust the armature with respect to the field-magnets that in revolving the bobbins would pass transversely through the field of force adjacent to one of the poles and then transversely through the field of force adjacent to the other pole. In my device, however, I have located the plane of revolution of the armature parallel to and between two planes, each of which contains one of the field-magnets and has united the opposite ends of these field-magnets by a pole-piece or plate of iron extending from one across to the other in such manner that instead of revolving through the field adjacent to the poles respectively the armature is caused to revolve within the plane containing the poles of the machine, so that the poles shall be opposite the periphery of the armature and diametrically opposite each other.

In carrying out my invention, A and B are the field-magnets connected by iron connections or pole-pieces C, so that, as seen in Fig. 2, the locality of the poles of the field-magnets shall be practically carried out into that portion of the plate opposite the periphery of the armature and in its plane of revolution.

D is the armature. E is its commutator. The bobbins of the armature may be connected up with the sections of the commutator in any usual way, and the commutator may be of any usual construction. In the machines I have made, however, I have employed the method of winding illustrated in Fig. 5, in which the bobbins are successively connected with each other and by radial wires with the segments of the commutator.

The commutator is shown in detail in Fig. 4, and consists of a small cylinder of hard rubber, vulcanized fiber, leatheroid, or other non-conducting substance, into which small pieces of angle-bar $e$ are set by pressure or otherwise. The wires leading from the bobbins of the armature toward the hub, as shown in Fig. 5, are soldered or otherwise fastened to the angle-bars $e$.

F represents brushes which bear upon the commutator in the usual manner. I find it convenient to construct the device, substantially as shown in the drawings, to locate one of the field-magnets upon one side of the axle of the armature and the other field-magnet upon the opposite side of said axle beyond the armature.

I have found a machine constructed as illustrated and described operates with very much less resistance, and consequently delivers a greater effective force with the same impelling-current than any form of machine with which I am acquainted, and I attribute this increased efficiency to the fact that the construction is such that the armature revolves diametrically between and in the plane containing the poles, instead of being obliged to cut through the said plane transversely. I am also of the opinion that a beneficial effect in lessening the resistance to the revolution of the armature is obtained by the location of the armature with respect to the poles, so that its bobbins shall have a motion first transversely from end to end of one magnet in a direction across or through the planes of its successive convolutions of wire, and then in like manner from end to end of the other field-magnet.

While I have described this device in connection with a motor, it is apparent that it is equally applicable in dynamo-electric generators, and I would have it understood that my claims apply with equal effect to a generator as to a motor.

What I claim is—

1. An electric motor or machine consisting of two field-magnets connected by iron pole-pieces at their ends, an armature located and adapted to revolve in a plane between the planes of the field-magnets respectively, and diametrically between said pole-pieces, one of said field-magnets being located upon one side of the armature in advance of its axle, the other upon the other side of the armature and back of its axle, a series of bobbins on said armature connected into a single circuit, and said circuit adjacent to each bobbin being also connected with the commutator-segments, substantially as described.

2. An electric motor or machine consisting of two field-magnets connected by iron pole-pieces at their ends, an armature located and adapted to revolve in a plane between the planes of the field-magnets respectively, and diametrically between said pole-pieces, one of said magnets located upon one side of the axle of the armature and the other magnet located in advance of the same upon the other side of the axle of the armature and beyond the plane of revolution of the armature, substantially as described.

In testimony whereof I sign this specification in the presence of two witnesses.

FRANK E. FISHER.

Witnesses:
M. B. O'DOGHERTY,
N. S. WRIGHT.